May 27, 1969     A. W. SERIO     3,446,403
DISPENSER
Filed Jan. 12, 1967     Sheet 1 of 2
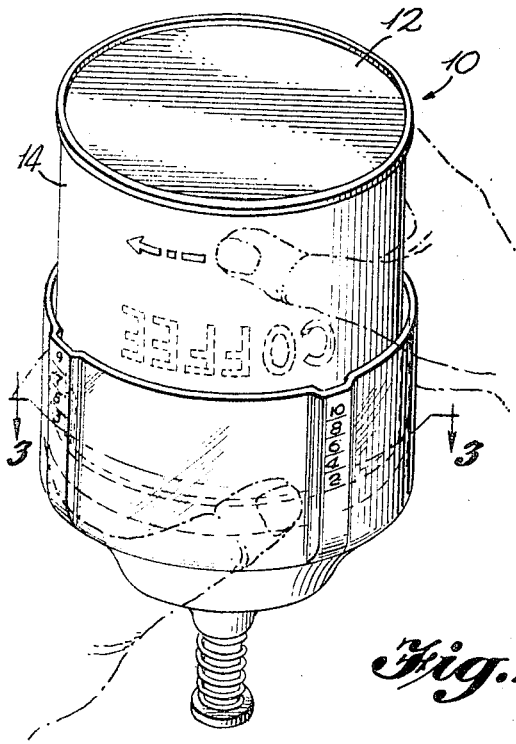
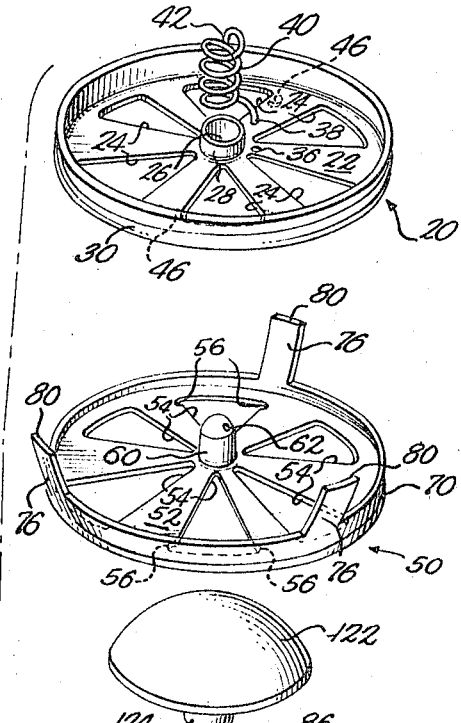
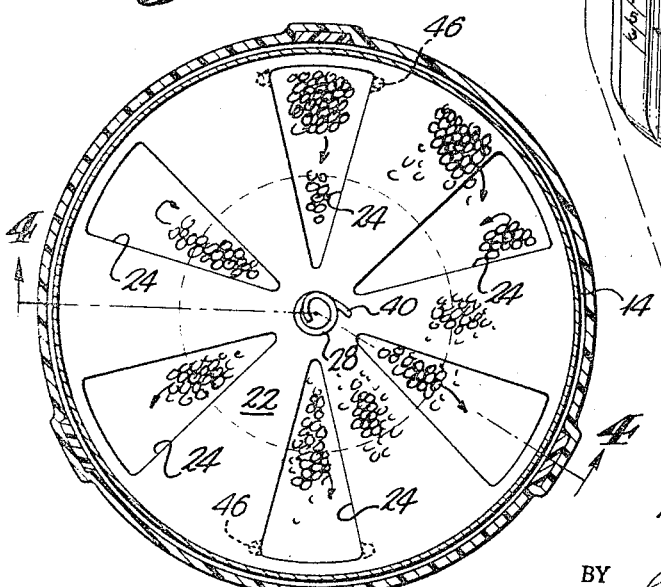
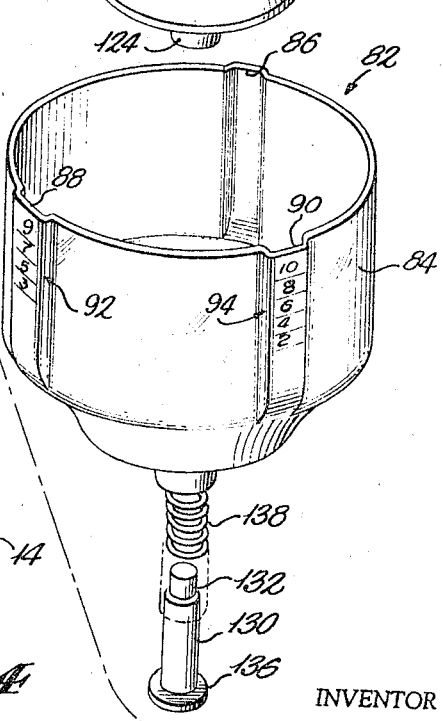
INVENTOR
Anthony W. Serio
BY Shoemaker and Mattare
ATTORNEYS INVENTOR
Anthony W. Serio
BY Shoemaker and Mattare
ATTORNEYS 3,446,403
DISPENSER
Anthony W. Serio, R.F.D. 1, Hillcrest Road, Elmira, N.Y., 14902; Dolores M. Serio, executrix of said Anthony W. Serio, deceased
Filed Jan. 12, 1967, Ser. No. 608,840
Int. Cl. B65d *83/06;* G01f *11/24;* B67d *5/38*
U.S. Cl. 222—158                                          10 Claims

ABSTRACT OF THE DISCLOSURE

A first body means is provided with a peripheral flange adapted to snap on the open end of a container such as a coffee can. This first body means has a plurality of generally triangular-shaped holes formed therethrough and also includes a central hole formed therethrough. A pair of depending stop lugs are formed on the undersurface of the first body means. The second body means has a peripheral flange which fits snugly about the peripheral flange of the first body means to hold the second body means in position and to permit rotation of the second body means with respect to the first body means. The second body means has a plurality of holes corresponding to the holes formed through the first body means so that these holes may either be aligned with one another to permit the contents of a container to pass therethrough or to be misaligned with one another to prevent the passage of material. Indentations are provided in the side walls of certain holes of the second body means for receiving the stop lugs on the first body means to limit relative rotation between the first and second body means. The second body means has a central hub which extends through the central hole in the first body means. A spring is connected between this central hub and the first body means for normally biasing the second body means with respect to the first body means to rotate into the position wherein the holes through the first and second body means are misaligned with one another. The second body means also includes three arms which extend upwardly and outwardly therefrom.

A third body means includes an outer wall having three spaced grooves therein for receiving the arms of the second body means. This connection permits the third body means to slide up and down with respect to the second body means, but rotation of the third body means from the exterior thereof will also cause the second body means to rotate therewith when it is desired to align the openings in the first and second body means. The outer wall of the third body means is transparent, and indicia are provided on the third body means adjacent the grooves therein. The upper ends of the arms of the second body means may be aligned with certain indicia so as to readily determine the capacity of the third body means and the amount of material which will be dispensed therefrom. The third body means includes a lower wall having a hole formed in the central part thereof. A closure means is provided for closing off this last mentioned hole, the closure means including a portion extending outwardly of the third body means. A compression spring engages a flange formed at the outer end of the outwardly extending portion of the closure means for normally biasing the closure means toward its closed position. The outer end of this outwardly extending portion of the closure means is adapted to engage the pump member of a conventional percolator mechanism or the like so that downward movement of the third body means will cause the closure means to be biased upwardly into its open position to dispense material through the hole in the third body means.

Background of the invention

The present invention relates to a dispenser particularly adapted for use with containers such as coffee containers for dispensing coffee from the associated container. Insofar as applicant is aware, there are no presently existing devices adapted to be secured directly to a container for accurately measuring the amount of material dispensed therefrom. Known devices for measuring amounts of coffee generally are separate from the container and require assembly and disassembly before and after use, and the dispensing means itself does not maintain a good seal to retain the freshness of the coffee. In addition, known methods of measuring coffee such as dipping in a spoon or the like are relatively inaccurate and do not provide uniform results.

Summary of the invention

In the present invention, the arrangement is such that the apparatus is supported directly by the container and once clamped in position on the container may remain in such position as long as there is coffee to be dispensed from the container. It is not necesary to remove the dispenser nor to assemble or disassemble the components thereof once it is placed in operative position.

The apparatus of the present invention provides indicia means along with a movable body portion so that the movable body portion can be adjusted to a predetermined location so that a very accurate amount of material may be dispensed from the associated container. This provides a much more precise measurement than is obtainable with a spoon or the like, and once the dispenser of the present invention has been placed in a certain position, the amount of material dispensed may be uniformly reproduced so as to provide the same result every time it is used. In addition, the dispenser of the present invention provides an effective seal, means being provided for normally biasing the components into sealing position so that the coffee will remain fresh at all times.

An object of the invention is to provide a new and novel dispenser which is adapted to be secured directly to a container and to remain on the container until all of the contents thereof are dispensed, and further to maintain a good seal on the container so that the contents thereof will stay fresh.

Another object of the invention is the provision of a dispenser for granular material such as coffee which is adapted to accurately dispense a predetermined amount and to provide uniform results throughout a number of dispensing operations.

Brief description of the drawings

FIG. 1 is a top perspective view of the dispenser of the present invention illustrated as being mounted in operative position on a coffee container;

FIG. 2 is a top perspective exploded view of the components of the dispenser of the present invention;

FIG. 3 is a sectional view taken substantially along line 3—3 of FIG. 1 looking in the direction of the arrows;

Description of the preferred embodiment

Figure 4:
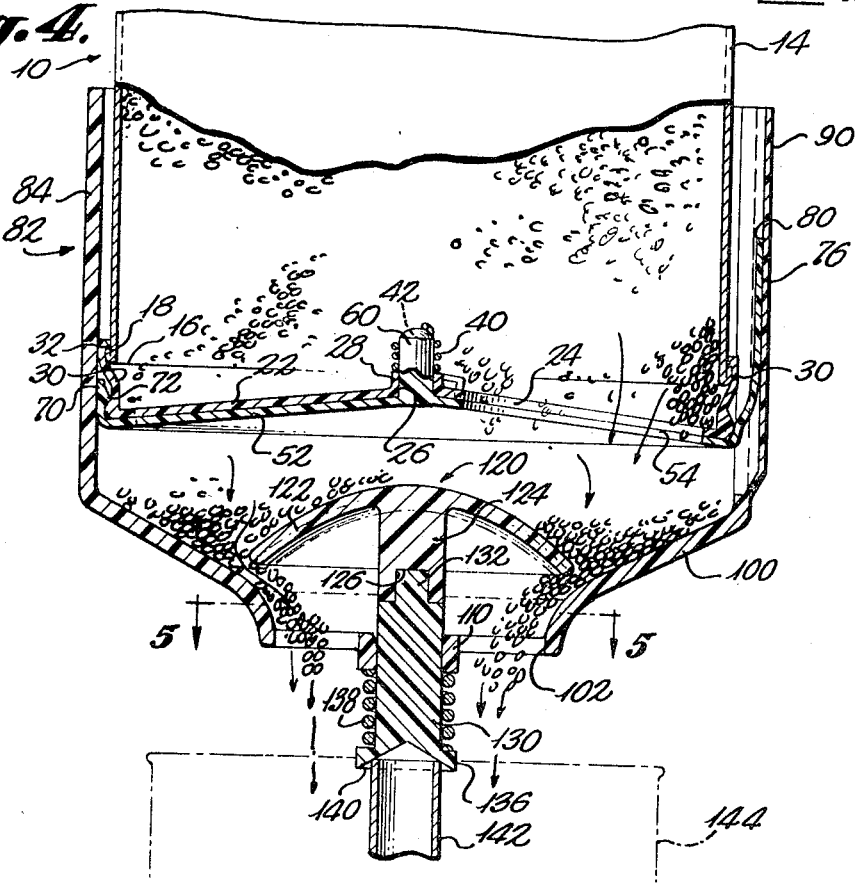
FIG. 4 is a sectional view taken substantially along line 4—4 of FIG. 3 looking in the direction of the arrows.

Referring now to the drawings wherein like reference characters designate corresponding parts throughout the several views, a container indicated generally by reference numeral 10 may be a conventional coffee container or the like formed of metal and including a bottom wall 12 and a substantially cylindrical side wall 14. It will be understood that the container has been inverted as shown in the drawings from its normal position, and as seen in FIG. 4, the original upper end of the container now forms the lower open end 16 of the container after the original top thereof has been removed. A bead 18 is formed around the periphery of this open end of the container.

As seen most clearly in FIG. 2, a first body means is indicated generally by reference numeral 20 and includes a bottom wall portion 20 which is of generally frusto-conical configuration as seen in FIG. 4, and as seen in FIG. 2, the bottom wall 22 is provided with a plurality of holes 24 shown as being six in number and of generally triangular plan configuration. The bottom wall 22 has a central hole 26 formed therethrough, and an upwardly extending annular portion 28 defines the upper part of the hole above the wall portion 22.

As seen most clearly in FIG. 4, the first body means includes a peripheral flange 30 having an inwardly extending lip 32 formed at the upper inner periphery thereof. This lip 32 is adapted to snap behind the bead 18 formed on the container whereby the first body means is adapted to be snapped tightly into place over the open end of the container.

Referring again to FIG. 2, the lower wall 22 of the first body means is provided with a hole 36 adapted to receive one end 38 of a coil spring 40. The opposite end 42 of coil spring 40 is directed in a downward direction for a purpose hereinafter described.

A pair of substantially diametrically opposite limit stop lugs 46 are formed integral with the undersurface of the bottom wall 22 of the first body means and depend therefrom. These limit stop lugs are adapted to cooperate with means provided on the second body means for limiting relative rotation therebetween as hereinafter set forth.

The second body means indicated generally by reference numeral 50 includes a bottom wall 52 of substantially the same configuration as the bottom wall 22 of the first body means so that these two bottom walls are adapted to fit substantially flush with one another as seen in FIG. 4. This bottom wall 52 as seen in FIG. 2 includes six spaced holes 54 corresponding to the holes 24 provided in the first body means. Holes 54 may be of substantially the same size as the holes 24 previously described, it being understood that the solid portions of wall 52 between the holes are of greater dimension than the holes themselves so that when the holes 54 and 24 are misaligned with one another, the solid portions of the wall portion 52 of the second body means is adapted to close off the holes 24 of the first body means so that no coffee will drop downwardly through these holes.

Diametrically opposite ones of the holes in the bottom wall 52 are provided with recesses 56 in the opposite side walls of the holes. These recesses 56 are adapted to receive the limit stop lugs 46 previously decribed for limiting relative rotation of the second body means with respect to the first body means. The arrangement is such that when the limit stop lugs 46 are disposed within one recess 56 of a particular hole, the holes 24 in body means 20 will be uncovered and open, while when the limit stop lugs are in the opposite recess of a particular hole, the holes 24 will be covered and closed.

Body means 50 is provided with a central hub 60 extending upwardly from the central portion of bottom wall 52, the upper end of this hub being rounded and provided with a hole 62 for receiving the aforementioned downturned upper end 42 of the coil spring 40. The arrangement is such that with the components in the assembled relationship shown in FIG. 4, the coil spring is connected between the hub 60 of the second body means and the bottom wall of the first body means whereby the second body means is caused to rotate with respect to the first body means so as to normally close off the holes 24. It should be understood that the first body means is tightly clamped on the associated container so that it will not readily turn with respect thereto.

As seen most clearly in FIG. 4, the bottom wall 52 of the second body means joins with a peripheral flange 70 having an inturned rib 72 formed in the inner surface thereof, this rib fitting within a corresponding recess portion in the outer surface of the flange 30 of the first body means. This interrelationship enables the second body means to be snapped onto the first body means and to be held in operative relationship with respect thereto, yet at the same time permitting the second body means to rotate with respect to the first body means.

Referring again to FIG. 2, the second body means 50 also includes three arms 76 equally spaced about the outer periphery thereof and extending upwardly and outwardly thereof. These arms terminate in flat upper edges 80 for a purpose hereinafter described.

A third body means is indicated generally by reference numeral 82 and includes a substantially cylindrical side wall 84 which is adapted to be disposed in surrounding relationship to and in engagement with the outer surfaces of the flanges 30 and 70 formed on the first and second body means. Side wall 84 is provided with three equally spaced vertically extending grooves 86, 88 and 90 which are adapted to receive the three spaced arms 76 provided on the second body means.

In the assembled relationship shown in FIG. 4, the third body means 82 is held in place by the friction of the outwardlly biased arms 76 which engage the bottom of the grooves of the third body means. While the frictional force is great enough to hold the third body means in a desired position, the third body means can be moved manually in a vertical direction so as to displace the third body means with respect to the remainder of the assembly.

As seen in FIG. 2, certain indicia or markings indicated by reference numerals 92 and 94 are provided in the material of the grooves 88 and 90 respectively. The third body means as well as the first and second body means may preferably be formed of a suitable plastic which is transparent. With this transparent arrangement, it is possible to view the arms 76 through the grooves 88 and 90. The flat upper ends 88 of the arms may be aligned with suitable indicia to indicate the position of the third body means with respect to the remainder of the assembly and to indicate the amount of coffee which will be dispensed when the holes 24 are opened so as to permit coffee to flow downwardly from the container. In a typical example, the various indicia at numbers may indicate the number of cups of coffee which can be brewed with the amount of coffee dispensed when the upper end of the arm 76 is aligned with such indicia marks.

While the third body means is adapted to slide vertically upwardly and downwardly with respect to the second body means and its associated arms 76, it should be understood that the interengagement of the arms 76 within the grooves of the third body means is such that when the third body means is grasped exteriorly and rotated, the second body means will be caused to rotate therewith thereby enabling the holes in the second body means to be aligned with those in the first body means to open the holes so that material can flow downwardly therethrough.

Figure 5:
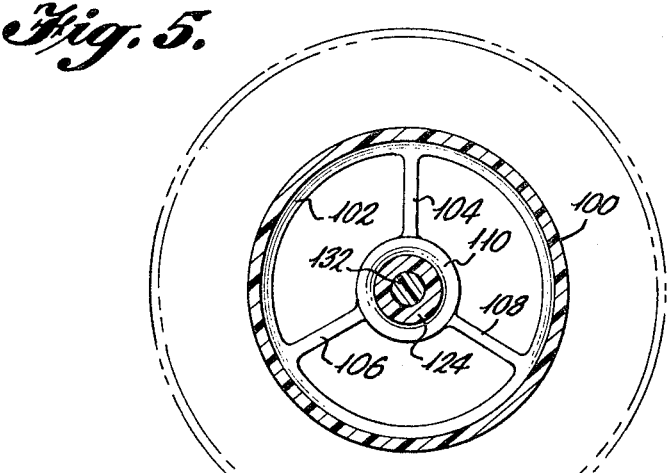
FIG. 5 is a sectional view taken substantially along line 5—5 of FIG. 4 looking in the direction of the arrows.

Referring again to FIG. 4, the side wall 84 of the third body means joins with a downwardly and inwardly tapering lower wall 100 having a central hole 102 formed at the bottommost portion thereof. As seen in FIG. 5, three radially inwardly extending ribs 104, 106 and 108 extend inwardly from wall portion 100 and are connected with a central annular collar 110.

As seen most clearly in FIG. 4, a closure means indicated generally by reference numeral 120 includes a generally dome-shaped member 122 having a central stem portion 124 extending downwardly therefrom and being provided with a central socket 126 in the lower end thereof. The closure means includes an outwardly extending substantially cylindrical portion 130 having a reduced upper end 132 which fits snugly within the socket 126 so that the portions 130 and 124 move in unison with one another. A radially outwardly extending annular flange 136 is provided at the lower end of portion 130, and a coil spring 138 is interposed between the undersurface of collar 110 and the flange 136 for normally biasing the closure means downwardly as seen in FIG. 4 into the closed position indicated in phantom line for preventing material from flowing downwardly and outwardly through the hole 102 of the third body means.

As seen in FIG. 4, the undersurface of the lower end of portion 130 is provided with a tapered recess 140. This recess is adapted to engage the upper end of the pump member 142 of a conventional percolator mechanism including a percolator basket as indicated by phantom line 144.

When it is desired to use the dispenser of the present invention, the first and second body means are assembled with respect to one another by snapping the second body means into place over the first body means and connecting the coil spring 40 between the associated parts of the first and second body means.

The top of a conventional metallic coffee container is then removed and the first body means along with the interconnected second body means is snapped into place about the bead around the open end of the coffee container.

The third body means may then be slid into the operative position illustrated in FIG. 4 wherein the arms of the second body means are received within the grooves of the third body means. The device is then ready for use.

When it is desired to dispense coffee from the device, the coffee container is inverted into the position shown in FIG. 1, and the third body means is adjusted vertically until the desired reading is obtained by cooperation of the upper ends of the arms of the second body means and the indicia provided on the grooves of the third body means.

The holes 24 and 54 in the first and second body means respectively are normally misaligned due to the action of spring 40. If it is now desired to align these openings the third body means and the container may be grasped as shown in FIG. 1, and the container moved in the direction indicated by the arrow with respect to the third body means and the second body means which are prevented from rotation. Since the container is fixed to the first body means, the first and second body means will be rotated relative to one another to align the holes 24 and 54.

Coffee will then flow downwardly from the container into the aligned holes as indicated by the arrow in FIG. 4 and into the lower portion of the third body means. Coffee cannot normally flow outwardly through the lower end of the third body means since the closure means is normally biased into its closed position by spring 138.

When the space in the lower portion of the third body means has been filled above the closure means up to the lower wall 52 of the second body means, either the container or the third body means may be released so as to allow the first and second body means to again be rotated by spring 40 until the holes 24 and 54 are misaligned.

The entire assembly may then be lowered onto the pump part of a conventional percolator mechanism so as to bias the closure means upwardly thereby allowing the coffee within the lower part of the third body means to flow downwardly through the hole 132 in the bottom thereof into the basket of the percolator mechanism.

Removal of the dispensers from the percolator mechanism will cause the closure means to again be automatically closed under the influence of spring 138 and the apparatus is again ready for dispensing.

If the amount of coffee to be dispensed changes, the third body means can be shifted axially with respect to the remaining portions of the assembly as required.

When the apparatus is to be stored for use at a later date, the coffee container can again be inverted so that it can be set down on the bottom thereof with the dispenser means attached thereto and extending thereabove.

The first and second body means will serve to provide a seal since the holes therethrough are misaligned whereby the coffee will remain fresh.

As this invention may be embodied in several forms without departing from the spirit or essential characteristics thereof, the present embodiment is therefore illustrative and not restrictive.

What is claimed is:
1. A dispenser comprising a first body means adapted to be mounted on a container, said first body means having hole means formed therethrough, a second body means supported by said first body means and disposed in abutting relationship therewith, said second body means having hole means formed therethrough, said second body means being movable relative to said first body means so as to selectively align said hole means or misalign said hole means whereby to allow the contents of an associated container to pass through the aligned openings or to block such movement when the openings are misaligned, a third body means supported by said second body means and forming therewith a lower chamber for receiving material passing through the aligned hole means in said first and second body means, said second body means being axially movable relative to the third body means to vary the capacity of the said lower chamber, said third body means having hole means in the bottom of said lower chamber, and closure means for selectively closing said last-mentioned hole means.

2. Apparatus as defined in claim 1 including means normally biasing said closure means into position for closing said hole means in said third body means, said closure means including a portion extending outwardly of said third body means and adapted to engage a cooperating member for opening said closure means.

3. A dispenser comprising a first body means adapted to be mounted on a container, said first body means having hole means formed therethrough, a second body means supported by said first body means and disposed in abutting relationship therewith, said second body means having hole means formed therethrough, said second body means being movable relative to said first body means so as to selectively align said hole means or misalign said hole means whereby to allow the contents of an associated container to pass through the aligned openings or to block such movement when the openings are misaligned, a third body means supported by said second body means and forming therewith a lower chamber for receiving material passing through the aligned hole means in said first and second body means, said second body means being movable relative to the third body means to vary the capacity of the said lower chamber, said third body means having hole means in the bottom of said lower chamber, and closure means for selectively closing said last-mentioned hole means, said first body means including a peripheral flange, the inner surface of said peripheral flange being adapted to engage the outer surface of an associated container for holding said first body means tightly on an associated container, said second body means including a peripheral flange the inner surface of which is adapted to engage the outer surface of said first-mentioned peripheral flange so as to mount said second body means on said first body means and to permit relative rotation of said second body means with respect to said first body means.

4. Apparatus as defined in claim 3 wherein said first body means has a central hole formed therein, said second body means including a central hub extending through said hole and resilient means connected between said first body means and said hub of said second body means for normally biasing said second body means for rotation with respect to said first body means so as to misalign the hole means in the first and second body means so as to prevent the contents of an associated container from passing through the hole means in said second body means.

5. Apparatus as defined in claim 3 wherein said second body means also includes a plurality of arms extending outwardly therefrom, said third body means having a plurality of grooves formed therein, said arms being slidably received within said grooves so as to hold said third body means in place relative to said second body means due to the frictional engagement of said arms with the groove means in said third body means while permitting relative sliding movement between said second body means and third body means, yet locking said second body means and third body means together for rotation with one another.

6. Apparatus as defined in claim 5 wherein the material of said third body means is transparent, said groove means having indicia means formed thereon and visible from the exterior of said third body means whereby a portion of said arms may be aligned with said indicia for positioning said third body means with respect to said first and second body means to receive a predetermined amount of the contents of an associated container.

7. Apparatus as defined in claim 1 wherein the hole means formed through said first body means and said second body means comprises a plurality of holes formed through each of said first body means and said second body means, the holes in each body means being spaced from one another and being of tapered configuration, said second body means being supported on said first body means for rotation with respect thereto, means normally biasing said second body means for rotation with respect to said first body means so as to misalign the holes of said first and second body means, and limit stop means for limiting the amount of relative rotation between said first body means and said second body means.

8. Apparatus as defined in claim 7 wherein said limit stop means includes at least one stop lug formed on the undersurface of said first body means, said second body means including at least one pair of recesses formed in the spaced side walls of one of said holes formed therethrough, said recesses being adapted to receive said limit stop lug for limiting movement of said second body means in opposite directions with respect to said first body means.

9. A dispenser comprising a first body means adapted to be mounted on a container, said first body means having hole means formed therethrough, a second body means supported by said first body means and disposed in abutting relationship therewith, said second body means having hole means formed therethrough, said second body means being movable relative to said first body means so as to selectively align said hole means or misalign said hole means whereby to allow the contents of an associated container to pass through the aligned openings or to block such movement when the openings are misaligned, a third body means supported by said second body means and forming therewith a lower chamber for receiving material passing through the aligned hole means in said first and second body means, said second body means being movable relative to the third body means to vary the capacity of the said lower chamber, said third body means having hole means in the bottom of said lower chamber, and closure means for selectively closing said last-mentioned hole means, said hole means in said first body means comprising a plurality of spaced holes formed therethrough, said first body means having a central hole formed therethrough, said first body means including a peripheral flange adapted to fit tightly about the outer surface of the open end of a container, the hole means of said second body means comprising a plurality of spaced holes, said second body means including a central hub extending through the central hole in said first body means, spring means interconnecting said hub with said first body means, said spring means normally biasing said second body means for rotation with respect to said first body means to misalign the holes in the first and second body means, said second body means including a peripheral flange fitting about the peripheral flange of said first body means to hold the second body means on the first body means and to permit relative rotation of said second body means with respect to said first body means, means for limiting the relative rotation between said first and second body means, said second body means including a plurality of arms extending outwardly therefrom, said third body means including a transparent outer wall disposed in surrounding relationship to the peripheral flanges formed on said first and second body means, said third body means having a plurality of grooves formed therein, each of said grooves receiving one of said arms whereby the arms are slidably disposed within the grooves to permit relative sliding movement of the third body means with respect to the second body means and yet holding the second and third body means to one another for rotation together, said arms when in said grooves providing sufficient frictional force to hold the third body means on the second body means.

10. Apparatus as defined in claim 9 wherein said closure means includes a portion extending outwardly of said third body means, spring means engaging said outwardly extending portion and normally biasing said closure means to a position to close off the hole means in said third body means, said outwardly extending portion being adapted to engage a member for opening the closure means.

References Cited

UNITED STATES PATENTS

| 2,750,072 | 6/1956 | Duncan | 222—48 X |
| 3,018,924 | 1/1962 | Reed | 222—48 |
| 3,347,415 | 10/1967 | Strom | 222—48 |
| 604,321 | 5/1898 | Haye | 222—450 X |
| 1,472,695 | 10/1923 | Stapley | 222—514 |
| 2,323,865 | 7/1943 | Barnes | 222—565 X |
| 2,736,463 | 2/1956 | Levine | 222—440 X |
| 2,806,639 | 9/1957 | Halverson | 222—450 |
| 3,145,880 | 8/1964 | Whatley | 222—565 X |
| 3,237,816 | 3/1966 | Anderson | 222—450 |

ROBERT B. REEVES, *Primary Examiner.*

NORMAN L. STACK, JR., *Assistant Examiner.*

U.S. Cl. X.R.

222—162, 449, 450, 518